(12) United States Patent
Theratil et al.

(10) Patent No.: US 11,035,385 B2
(45) Date of Patent: Jun. 15, 2021

(54) FAN ROTOR WITH FLOW INDUCED RESONANCE CONTROL

(71) Applicant: PRATT & WHITNEY CANADA CORP., Longueuil (CA)

(72) Inventors: Ignatius Theratil, Mississauga (CA); Krishna Balike, Brampton (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 55 days.

(21) Appl. No.: 16/591,876

(22) Filed: Oct. 3, 2019

(65) Prior Publication Data

US 2020/0149554 A1 May 14, 2020

Related U.S. Application Data

(63) Continuation of application No. 15/465,808, filed on Mar. 22, 2017, now Pat. No. 10,480,535.

(51) Int. Cl.
*F04D 29/66* (2006.01)
*F04D 29/32* (2006.01)
(Continued)

(52) U.S. Cl.
CPC .......... *F04D 29/666* (2013.01); *F01D 5/141* (2013.01); *F01D 5/16* (2013.01); *F04D 29/324* (2013.01); *F04D 29/327* (2013.01); *F04D 29/384* (2013.01); *F04D 29/668* (2013.01); *B64D 27/20* (2013.01); *F05D 2230/10* (2013.01);
(Continued)

(58) Field of Classification Search
CPC .......... F01D 5/141; F01D 5/16; F04D 29/324; F04D 29/327; F04D 29/668; F04D 29/325; F05D 2230/10; F05D 2240/303; F05D 2240/304; F05D 2260/961; F05D 2240/307; Y02T 50/673
USPC ............ 416/223 R, 234, 243; 29/889, 889.2, 29/889.23
See application file for complete search history.

(56) References Cited

U.S. PATENT DOCUMENTS 3,347,520 A   10/1967 Owczarek
4,089,618 A * 5/1978 Patel ...................... F04D 29/384
                                                                                        416/228
(Continued)

FOREIGN PATENT DOCUMENTS

EP   1211383   6/2002
EP   2072758   6/2006
(Continued)

*Primary Examiner* — George C Jin
*Assistant Examiner* — Teuta B Holbrook
(74) *Attorney, Agent, or Firm* — Norton Rose Fulbright Canada LLP

(57) ABSTRACT

A rotor for a gas turbine is disclosed which includes alternating first and second set of rotor blades, the first set of rotor blades having a baseline profile and the second set of rotor blades having a profile with a cutback relative to the baseline profile, the cutback defining a removed portion of the baseline profile surrounding a maximum deflection point of a selected natural vibration mode. The cutback may be a leading edge cutback at a span position located a distance away from the hub between 20% and 50% of the total span length. The selected natural vibration mode may be a natural vibration mode higher than the 1st natural vibration mode, more specifically may be the 5t" natural vibration mode.

15 Claims, 7 Drawing Sheets

(51) Int. Cl.
    *F01D 5/16*     (2006.01)
    *F01D 5/14*     (2006.01)
    *F04D 29/38*     (2006.01)
    *B64D 27/20*     (2006.01)

(52) U.S. Cl.
    CPC .. *F05D 2240/303* (2013.01); *F05D 2240/304* (2013.01); *F05D 2260/961* (2013.01); *Y02T 50/60* (2013.01)

(56) References Cited

U.S. PATENT DOCUMENTS

| | | | |
|---|---|---|---|
| 4,097,192 A * | 6/1978 | Kulina | F01D 5/14 |
| | | | 416/175 |
| 4,878,810 A | 11/1989 | Evans | |
| 4,919,593 A * | 4/1990 | Brown | F01D 5/16 |
| | | | 29/889.7 |
| 5,031,313 A | 7/1991 | Blair | |
| 5,286,168 A | 2/1994 | Smith | |
| 5,498,137 A * | 3/1996 | El-Aini | F01D 5/16 |
| | | | 416/229 A |
| 5,966,525 A | 10/1999 | Manzi et al. | |
| 5,988,982 A | 11/1999 | Clauer | |
| 6,042,338 A | 3/2000 | Brafford et al. | |
| 6,183,197 B1 | 2/2001 | Bunker et al. | |
| 6,379,112 B1 | 4/2002 | Montgomery | |
| 6,428,278 B1 | 8/2002 | Montgomery et al. | |
| 6,471,482 B2 | 10/2002 | Montgomery et al. | |
| 6,607,359 B2 | 8/2003 | Von Flotow | |
| 6,796,408 B2 * | 9/2004 | Sherwin | F01D 5/26 |
| | | | 188/378 |
| 6,976,826 B2 | 12/2005 | Roy et al. | |
| 7,024,744 B2 | 4/2006 | Martin et al. | |
| 7,207,772 B2 | 4/2007 | Johann | |
| 7,234,914 B2 | 6/2007 | Usab et al. | |
| 7,643,975 B2 | 1/2010 | Vahdati et al. | |
| 7,648,330 B2 | 1/2010 | Schwaller et al. | |
| 7,878,759 B2 | 2/2011 | Mills et al. | |
| 8,043,063 B2 | 10/2011 | Kelly et al. | |
| 8,167,572 B2 | 5/2012 | Tardif et al. | |
| 8,172,510 B2 | 5/2012 | Duong et al. | |
| 8,540,490 B2 | 9/2013 | Ramakrishnan et al. | |
| 8,656,589 B2 | 2/2014 | Kurt-Elli | |
| 8,678,752 B2 | 3/2014 | Delvaux et al. | |
| 9,062,554 B2 | 6/2015 | Bielek | |
| 9,097,125 B2 | 8/2015 | Ghorbani et al. | |
| 9,121,284 B2 | 9/2015 | Pope | |
| 10,215,194 B2 | 2/2019 | Theratil et al. | |
| 10,400,783 B1 * | 9/2019 | Allard | B60H 1/24 |
| 2002/0064458 A1 * | 5/2002 | Montgomery | F04D 29/666 |
| | | | 415/208.3 |
| 2002/0067991 A1 * | 6/2002 | Montgomery | F01D 5/16 |
| | | | 416/203 |
| 2002/0164253 A1 | 11/2002 | Von Flotow | |
| 2004/0126235 A1 * | 7/2004 | Barb | F01D 5/141 |
| | | | 416/1 |
| 2006/0073022 A1 | 4/2006 | Gentile et al. | |
| 2007/0041841 A1 | 2/2007 | Walter et al. | |
| 2007/0231141 A1 * | 10/2007 | Chaing | F01D 5/048 |
| | | | 416/185 |
| 2008/0134504 A1 | 6/2008 | Schoenenborn | |
| 2008/0166241 A1 * | 7/2008 | Herr | F03D 1/065 |
| | | | 416/241 R |
| 2009/0313823 A1 * | 12/2009 | Rockstroh | F01D 5/005 |
| | | | 29/889.1 |
| 2010/0247310 A1 * | 9/2010 | Kelly | F01D 5/10 |
| | | | 416/1 |
| 2013/0142659 A1 | 6/2013 | Glaspey | |
| 2013/0170947 A1 | 7/2013 | Kurt-Elli et al. | |
| 2013/0195652 A1 | 8/2013 | Pope | |
| 2013/0202444 A1 | 8/2013 | Wunderer | |
| 2013/0247671 A1 | 9/2013 | Nakayama et al. | |
| 2014/0050590 A1 * | 2/2014 | Ghorbani Zarimahalleh | |
| | | | F01D 5/141 |
| | | | 416/241 R |
| 2014/0119929 A1 * | 5/2014 | Schlemmer | F01D 5/141 |
| | | | 416/223 R |
| 2014/0294595 A1 * | 10/2014 | Carroll | F03D 1/0633 |
| | | | 416/242 |
| 2014/0314548 A1 | 10/2014 | Rivers et al. | |
| 2014/0377075 A1 | 12/2014 | Warikoo et al. | |
| 2015/0139789 A1 | 5/2015 | Schoenenborn | |
| 2015/0292337 A1 | 10/2015 | Gentile et al. | |
| 2015/0322803 A1 | 11/2015 | Fulayter et al. | |
| 2016/0017796 A1 | 1/2016 | Xu et al. | |
| 2016/0053617 A1 | 2/2016 | Grelotti et al. | |
| 2016/0290137 A1 * | 10/2016 | Li | F01D 5/141 |
| 2017/0030203 A1 * | 2/2017 | Synnott | C23C 4/01 |
| 2017/0175531 A1 * | 6/2017 | Beckman | B64C 39/024 |
| 2017/0175776 A1 | 6/2017 | Theratil et al. | |

FOREIGN PATENT DOCUMENTS

| | | |
|---|---|---|
| EP | 2022988 | 2/2009 |
| EP | 2072758 | 6/2009 |
| EP | 2896791 | 7/2015 |
| EP | 3075955 | 10/2016 |
| GB | 2490127 | 10/2012 |
| JP | 2003106295 | 4/2003 |
| WO | 2006084438 | 8/2006 |
| WO | 2014130332 | 8/2014 |
| WO | 2015023325 | 2/2015 |
| WO | 2014197119 | 3/2015 |
| WO | 2015112305 | 7/2015 |

* cited by examiner

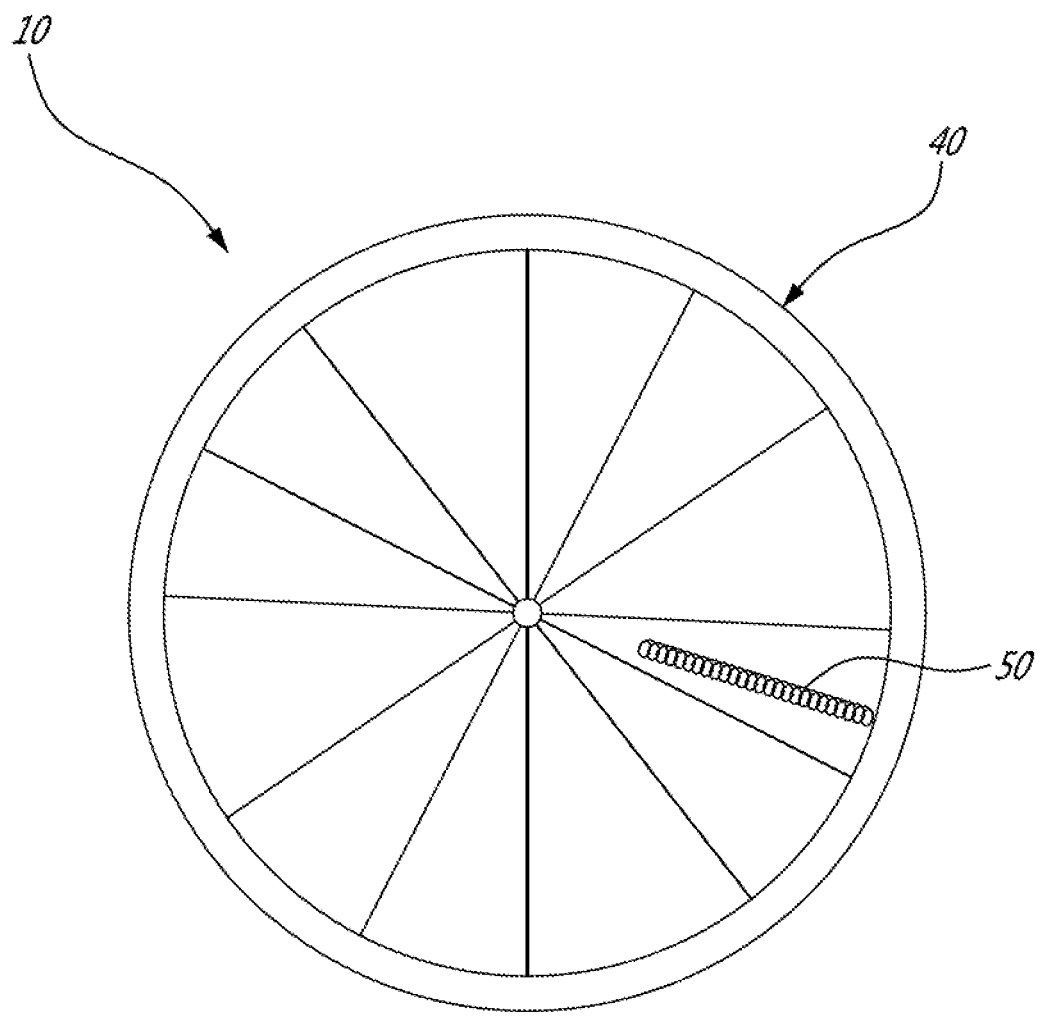

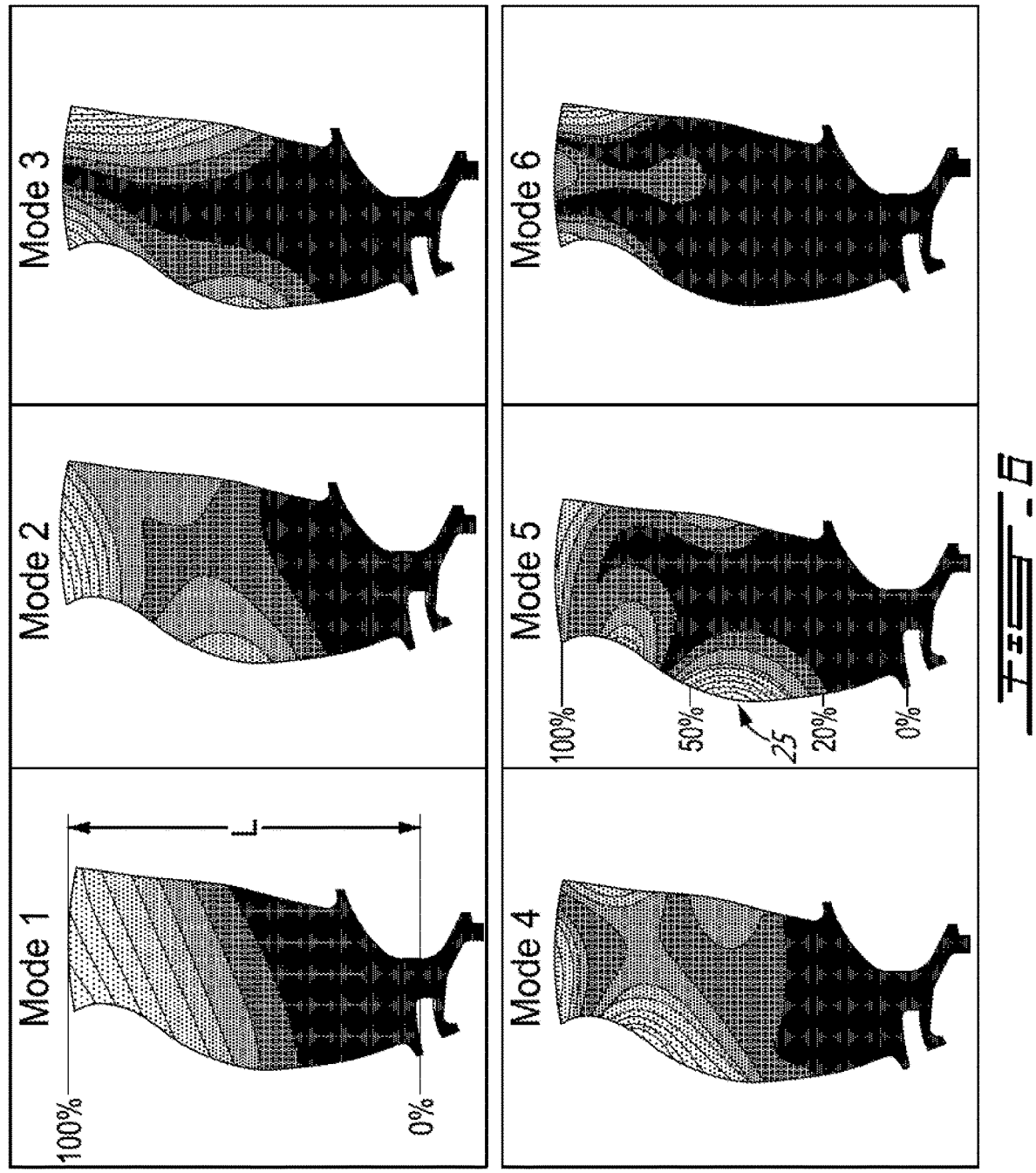

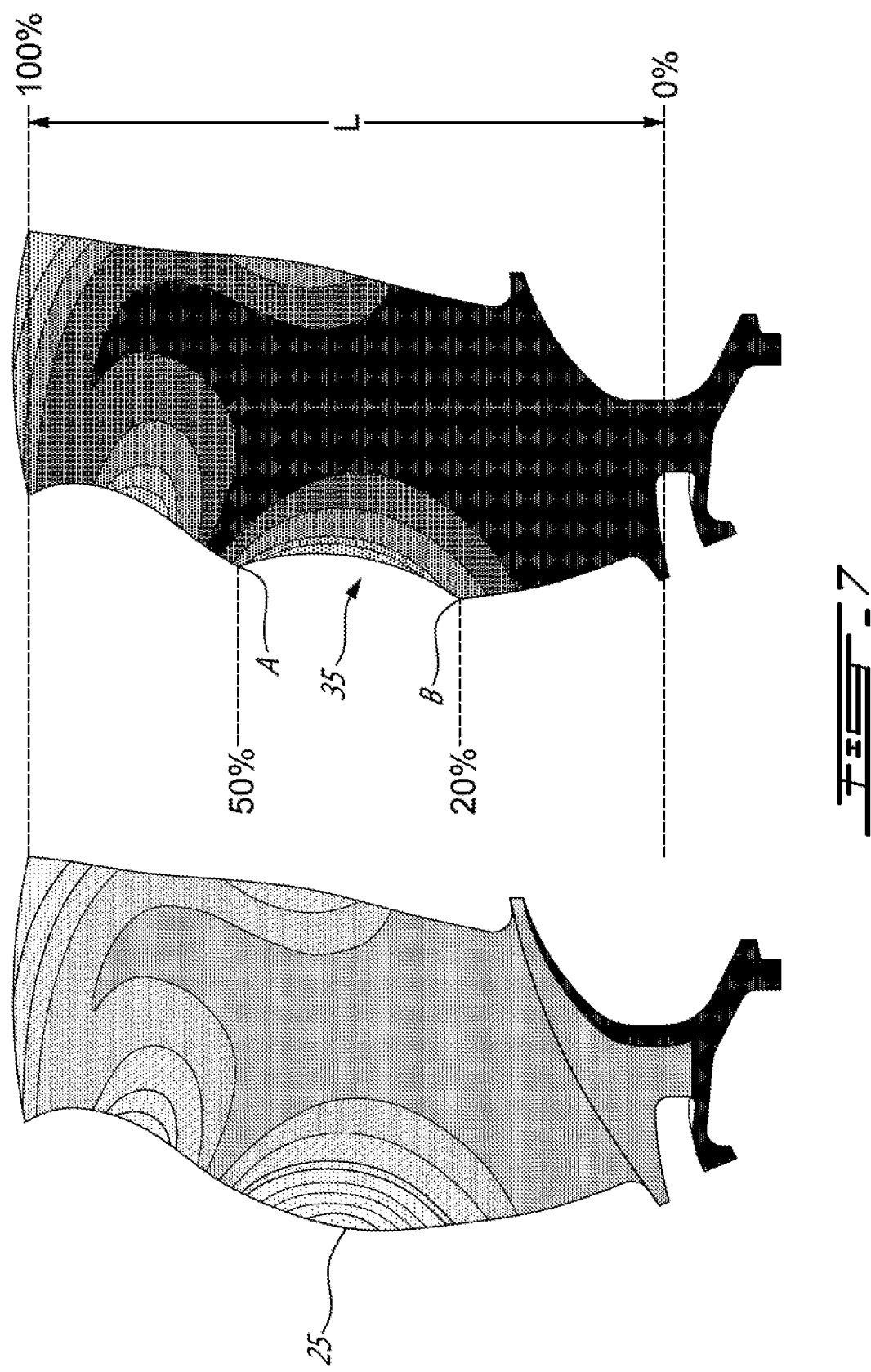

FAN ROTOR WITH FLOW INDUCED RESONANCE CONTROL

CROSS-REFERENCE TO RELATED APPLICATIONS

The present application is a continuation of U.S. patent application Ser. No. 15/465,808 filed Mar. 22, 2017, the entire content of which is incorporated herein by reference.

TECHNICAL FIELD

The application relates generally to rotating airfoils and, more particularly, to controlling flow induced resonance during irregular operating conditions.

BACKGROUND OF THE ART

Aerodynamic instabilities, such as but not limited to flutter, can occurs in a gas turbine engine when two or more adjacent blades of a rotor of the engine, such as the fan, vibrate at a frequency close to their natural frequency and the interaction between adjacent blades maintains and/or strengthens such vibration. Other types of aerodynamic instability, such as resonant response, may also occur and are undesirable. Prolonged operation of a rotor undergoing such aerodynamic instabilities can produce a potentially undesirable result caused by airfoil stress load levels exceeding threshold values. Attempts have been made to mechanically or structurally mistune adjacent blades of such rotors, so as to separate their natural frequencies. Such solutions however introduce a level of manufacturing complexity that is not always desirable. Aerodynamically mistuning adjacent blades so as to reduce flow induced resonance has been attempted, but existing solutions have however shown limits during certain irregular operating conditions, such as during cross-wind operating conditions which may result in sudden nacelle ingestion of flow vortices.

There is an ongoing need for mitigating aerodynamic instabilities.

SUMMARY

There is accordingly provided a fan for a gas turbine, the fan comprising fan blades circumferentially distributed around and extending a full span length from a central hub, the fan blades including alternating first and second fan blades, the first fan blades having a baseline profile and the second fan blades having a modified profile being the same as the baseline profile but for a leading edge cutback, the leading edge cutback on the second fan blades located between 20% and 50% of the full span length away from the hub, a maximum deflection point for a selected natural vibration mode of the first fan blade having the baseline profile is located at a given span, and wherein a span location on the second fan blades corresponding to the given span is located within the leading edge cutback.

There is also provided a rotor for a gas turbine, the rotor comprising rotor blades circumferentially distributed around and extending a total span length from a central hub, the rotor blades including alternating first and second rotor blades, the first rotor blades having a leading edge baseline profile and the second rotor blades having a leading edge profile with a leading edge cutback relative to the baseline profile, the leading edge cutback extending from a first span position to a second span position, wherein the first and second span positions are located at a distance away from the hub of between 20% and 50% of the total span length.

There is further provided a rotor for a gas turbine, the rotor comprising rotor blades circumferentially distributed around and extending a total span length from a central hub, the rotor blades including alternating first and second rotor blades, the first rotor blades having a baseline profile and the second rotor blades having a profile with a leading edge cutback relative to the baseline profile, the leading edge cutback of the second rotor blades defining a removed portion of the baseline profile surrounding a maximum deflection point of a selected natural vibration mode higher than the $1^{st}$ natural vibration mode.

In an alternate aspect, there is provided a fan for a gas turbine, the fan comprising fan blades circumferentially distributed around and extending a full span length from a central hub, the fan blades including alternating first and second fan blades, the first fan blades having a baseline profile and the second fan blades having a modified profile being the same as the baseline profile but for a leading edge cutback, the leading edge cutback extending from a first span position to a second span position, wherein the first span position is located radially outwardly of a span location corresponding to a maximum deflection point for a selected natural vibration mode of a fan blade having a baseline profile and wherein the second span position is located radially inwardly of the maximum deflection point.

The first span position may be located at a distance away from the hub not exceeding 50% of the total span length and the second span position may located at a distance away from the hub exceeding 20% of the total span length.

The leading edge cutback may remove a portion of the baseline profile surrounding the maximum deflection point and all points of at least 95% and of no less than 65% of maximum deflection of the selected natural vibration mode.

The selected natural vibration mode may be a natural vibration mode higher than the $1^{st}$ natural vibration mode or may be the $5^{th}$ natural vibration mode.

The fan blades may be swept fan blades.

The fan blades may include successively alternating first, second and third fan blades, the third fan blades having a second modified profile, the second modified profile being the same as the baseline profile but for a cutback different from the cutback of the modified profile of the second fan blades.

In another aspect, there is provided a rotor for a gas turbine, the rotor comprising rotor blades circumferentially distributed around and extending a total span length from a central hub, the rotor blades including alternating first and second rotor blades, the first rotor blades having a leading edge baseline profile and the second rotor blades having a leading edge profile with a leading edge cutback relative to the baseline profile, the leading edge cutback extending from a first span position to a second span position, wherein the first and second span positions are located at a distance away from the hub not exceeding 50% of the total span length.

In a further aspect, there is provided a rotor for a gas turbine, the rotor comprising rotor blades circumferentially distributed around and extending a total span length from a central hub, the rotor blades including alternating first and second rotor blades, the first rotor blades having a baseline profile and the second rotor blades having a profile with a cutback relative to the baseline profile, the cutback defining a removed portion of the baseline profile surrounding a maximum deflection point of a selected natural vibration mode.

Further details of these and other aspects of the subject matter of this application will be apparent from the detailed description and drawings included below.

DESCRIPTION OF THE DRAWINGS

Reference is now made to the accompanying figures in which:

FIG. 5 is a schematic frontal view of the gas turbine engine shown in FIG. 1, when subject to cross-wind operating conditions, FIG. 6 are schematic side views of various natural vibration modes of a fan blade, showing the location of the point of maximum deflection for the $5^{th}$ natural vibration mode; and FIG. 7 is a side elevational view of the first and second fan blade of the fan rotor of FIG. 2.

DETAILED DESCRIPTION

Figure 1:
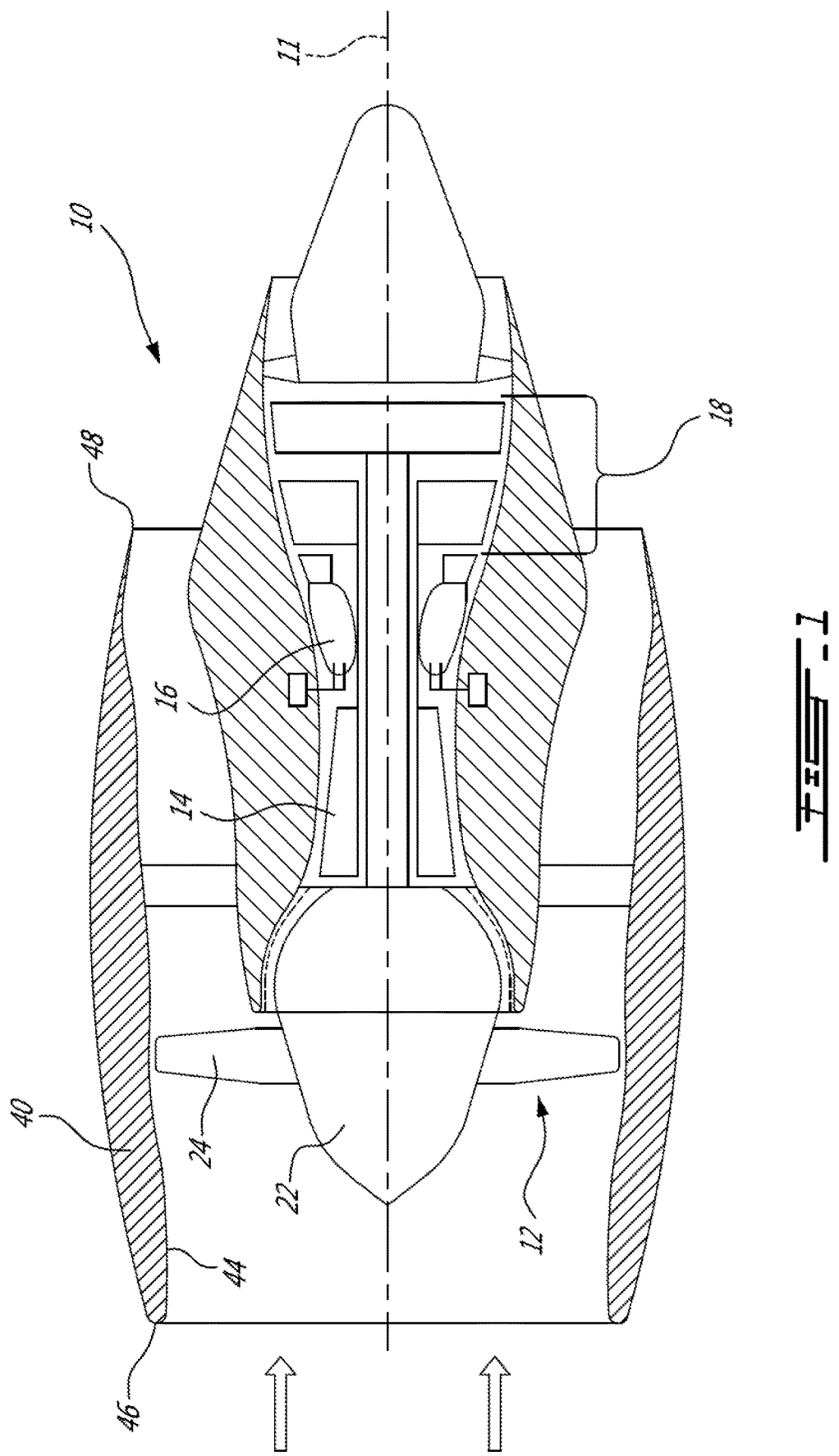
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. Engine 10 also comprises a nacelle 20 for containing various components of engine 10. Nacelle 40 has an annular interior surface 44, extending axially from an upstream end 46 (often referred to as the nose/inlet cowl) to a downstream end 48, for directing the ambient air (the direction of which is shown in double arrows in FIG. 1). Although the example below is described as applied to a fan of a turbofan engine, it will be understood the present teachings may be applied to any suitable gas turbine compressor rotor.

Figure 2:
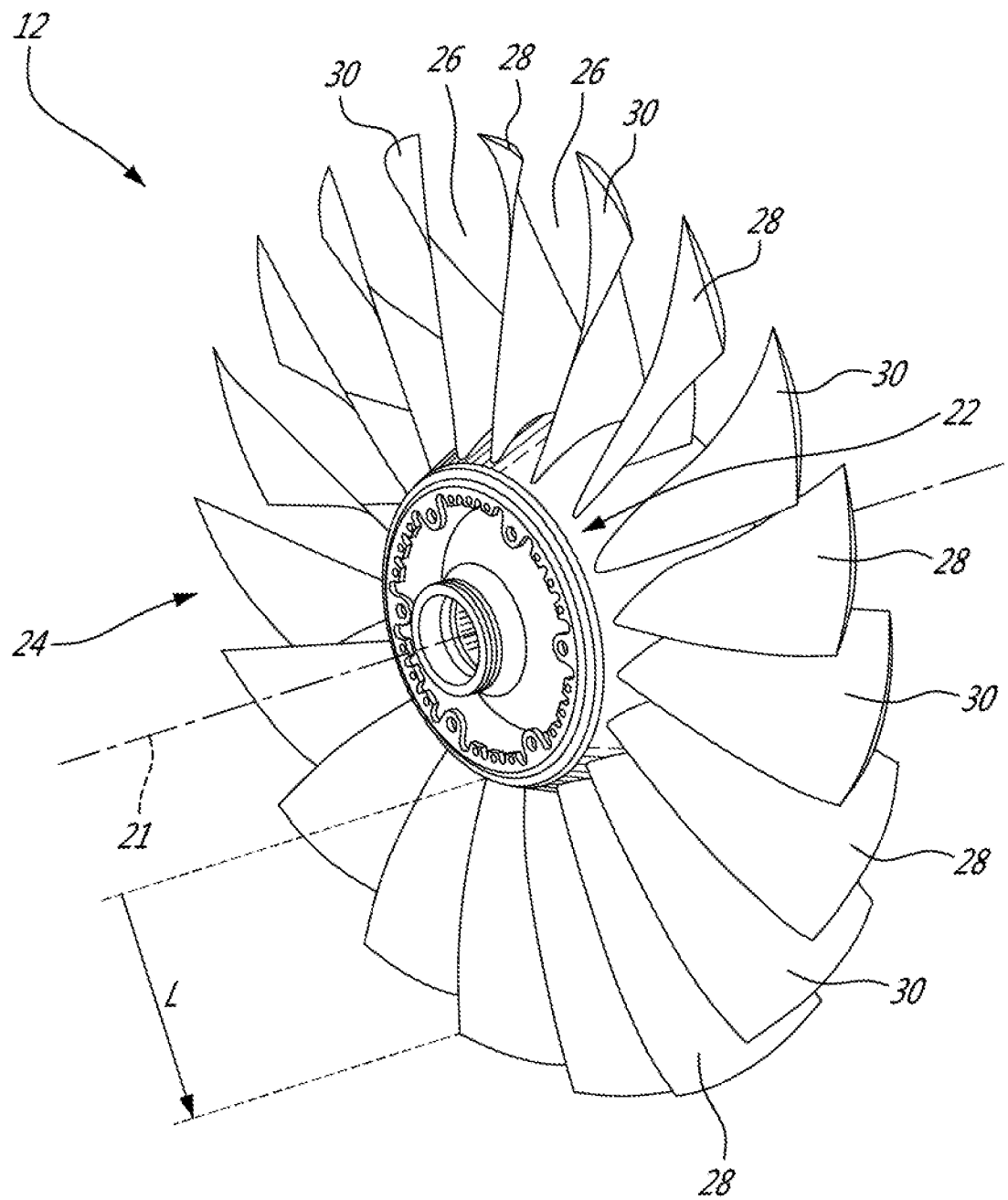
FIG. 2 is a perspective view of a fan rotor of the gas turbine engine shown in FIG. 1.

As shown in more details in FIG. 2, fan 12 includes a central hub 22, which in use rotates about an axis of rotation 21, and a circumferential row of fan blades 24 that are circumferentially distributed and which project a total span length L from hub 22 in a span-wise direction (which may be substantially radially). The axis of rotation 21 of the fan 12 may be coaxial with the main engine axis 11 of the engine 10 as shown in FIG. 1. The fan 12 may be either a bladed rotor, wherein the fan blades 24 are separately formed and fixed in place on the hub 22, or the fan 12 may be an integrally bladed rotor (IBR), wherein the fan blades 24 are integrally formed with the hub 22. Each circumferentially adjacent pair of fan blades 24 defines an inter-blade passages 26 there-between for the working fluid.

The circumferential row of fan blades 24 of fan 12 includes two or more different types of fan blades 24, in the sense that a plurality of sets of blades are provided, each set having airfoils with non-trivially different shapes, which difference will be described in more details below and illustrated in further figures. More particularly, these two or more different types of fan blades 24 are composed, in this example, of successively circumferentially alternating sets of fan blades, each set including at least first and second fan blades 28 and 30 (the blades 28 and 30 having profiles which are different from one another, as will be described and shown in further details below).

Flow induced resonance refers to a situation where, during operation, adjacent vibrating blades transfer energy back and forth through the air medium, which energy continually maintains and/or strengthens the blades' natural vibration mode. Fan blades have a number of oscillation patterns, any of which, if it gets excited and go into resonance, can result in flow induced resonance issues. The blade's oscillation pattern with the lowest frequency is referred to as Natural Vibration Mode 1 (or $1^{st}$ Natural Vibration Mode), the blade's oscillation pattern with the $2^{nd}$ lowest frequency is referred to as Natural Vibration Mode 2 (or $2^{nd}$ Natural Vibration Mode) etc. . . . . Whereas the lower natural vibration modes typically consist of simple oscillation patterns (pure bending or torsion), higher natural vibration modes typically consist of more complex oscillation patterns (often comprising combinations of bending and torsion patterns).

Figure 3:
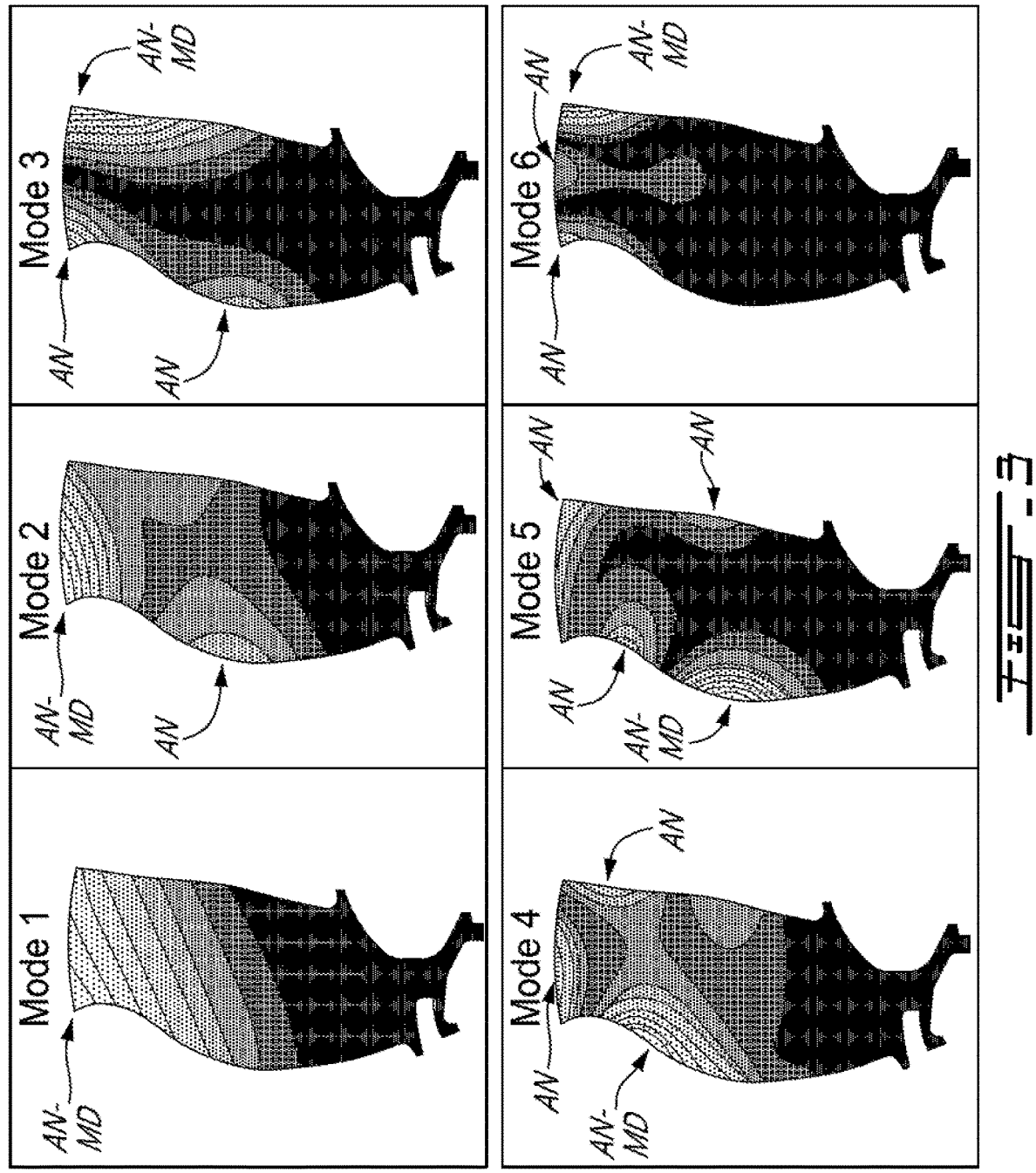
FIG. 3 are schematic side views of various natural vibration modes of a fan blade, showing the location of the anti-nodes for each natural vibration mode.

FIG. 3 is a computer modeling of blade movement for specific natural vibration modes (i.e. specific oscillation patterns), the shading reflecting the deflection range spectrum, from 0% deflection (dark) to 100% (or maximum) deflection (light). Although what is shown (and described) are swept (or belly shaped) fan blades, it will be understood the present teachings may be applied to other types of fan blades, such as radial fan blades, and, more generally, to other types of rotor blades, such as gas turbine compressor rotor blades.

As is shown in FIG. 3, the location and number of anti-nodes AN vary from one natural vibration mode to another. Furthermore, the anti-nodes AN do not all have the same amplitude; more specifically, the location of the anti-node AN with the greatest amplitude, what is known as the anti-node with the maximum deflection AN-MD, vary from one natural vibration mode to another. Indeed, as shown in FIG. 3, for certain natural vibration modes (in the current embodiment, the $1^{st}$, $2^{nd}$, $4^{th}$ and $5^{th}$ natural vibration modes), the maximum deflection AN-MD is located on the leading edge, whereas for other natural vibration modes (in the current embodiment, the $3^{rd}$ and 6th natural vibration modes), the maximum deflection AN-MD is located on the trailing edge.

Whereas any natural vibration mode that gets excited and go into resonance can lead to a structural durability issue, identifying which natural vibration mode is of concern and in need to be addressed will depend on the type of operating condition. During normal operating conditions, flow induced resonance issues are typically associated with lower natural vibration modes, more specifically the $1^{st}$ natural vibration mode (and sometimes the $2^{nd}$ natural vibration mode). However, during other types of operating conditions, flow induced resonance issues are typically associated with higher natural vibration modes.

Figure 4:
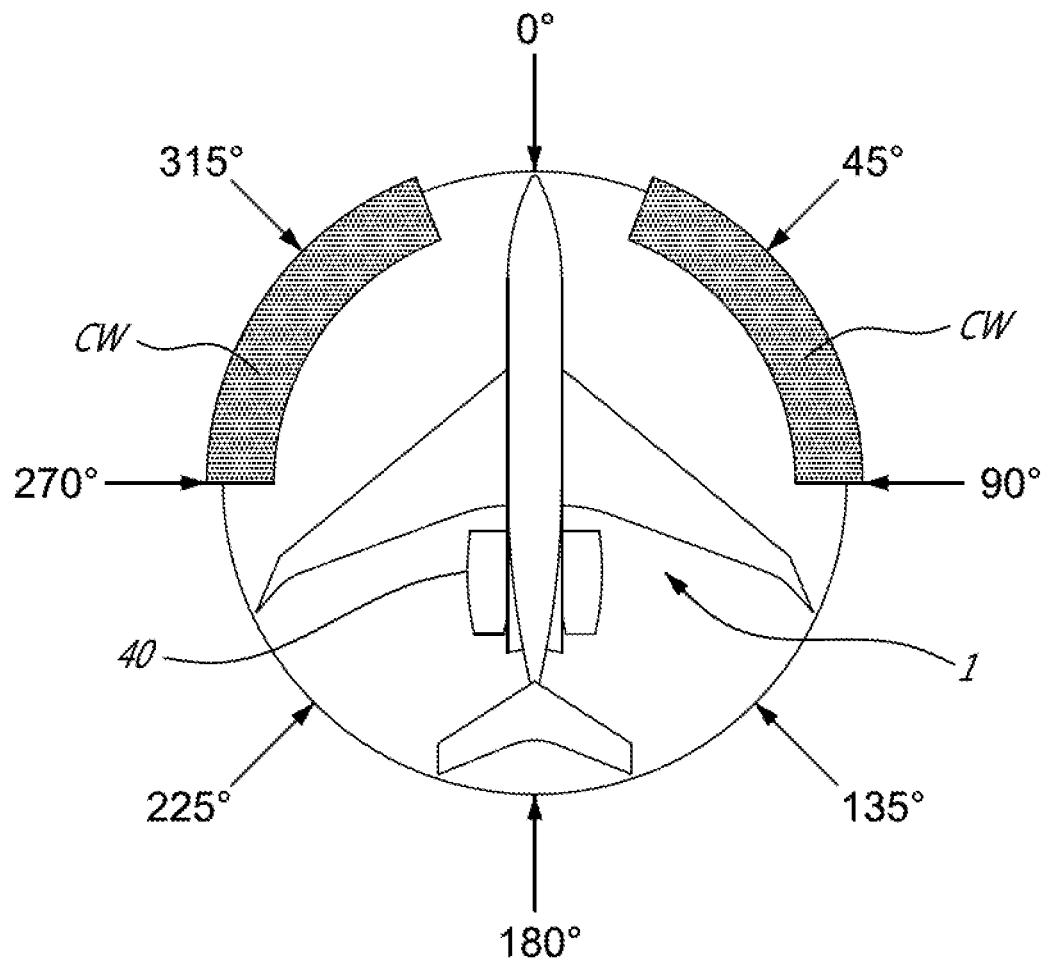
FIG. 4 is a schematic top view of an aircraft, propelled by the gas turbine engine shown in FIG. 1, subject to cross-wind operating conditions.

For example, when engine 10 is subject to cross-wind operating conditions i.e. when aircraft 1 is subject to relative wind angles of 15-90 degrees or 270-345 degrees (see items CW in FIG. 4), it has been found that nacelle 40 is subject to circumferentially asymmetric ingestion of flow vortices 50 (see FIG. 5). Such vortices may have been generated from a number of sources, including wash from aircraft 1's fuselage or nose/inlet cowl 46. Such ingestion of flow vortices 50 have been found to cause flow induced resonance issues associated with higher natural vibration modes of fan blades 24, more specifically the $5^{th}$ natural vibration mode with respect to the current embodiment of swept (or belly shaped) fan blades.

FIG. 6 shows fan blades 24, more specifically swept (or belly shaped) fan blades, in the same natural vibration modes as shown in FIG. 3, but focuses its attention on a specific higher natural vibration modes associated with cross-wind operating conditions, more specifically the $5^{th}$ natural vibration mode. FIG. 6 shows maximum deflection point 25, which is the location where the anti-node with the maximum deflection AN-MD is located on fan blades 24.

It has been found that removing blade material where the anti-node with the maximum deflection AN-MD is located on alternating blades for a particular natural vibration mode mitigates the flow induced resonance issues associated with such natural vibration mode. For example, during normal operating conditions involving the current embodiment of swept (or belly shaped) fan blades, where flow induced resonance issues are mostly associated with natural vibration mode 1, a tip leading edge cutback on alternating blades mitigates such issues. It has however been found that, during cross-wind operating conditions involving the current embodiment of swept (or belly shaped) fan blades, flow induced resonance issues are associated with higher natural vibration modes than natural vibration mode 1, such as natural vibration mode 5; in such circumstances, a tip leading edge cutback is not as effective as a leading edge cutback at a span location corresponding to the maximum deflection point 25.

Although the exact location would vary from one set of fan blades to another, it has been found that the point of maximum deflection 25 for the $5^{th}$ natural vibration mode is located between the 20% and 50% total span length L (to be more precise, at 35% total span length L, as shown in FIG. 6). For engines where the $5^{th}$ natural vibration mode is identified as problematic from a flow induced resonance perspective during cross-wind conditions, a leading edge cutback on alternating blades at a span position between the 20% and 50% total span length L has been found to mitigate the related flow induced resonance issue. As shown in FIG. 7, this means that first fan blades 28 would have a baseline profile, more specifically, a baseline leading edge profile, and second fan blades 30 would have a baseline profile with a leading edge cutback 35. Leading edge cutback 35 extends from a first span position 35A, located radially outwardly of the point of maximum deflection 25 to a second span position 35B, located radially inwardly of the point of maximum deflection 25, such that not only the portion of blade 30 that are anticipated to be subjected to 100% maximum deflection are removed, but other neighbouring blade portions also. In this respect, it has been found that, at a minimum, portion of blade 30 that are anticipated to be subjected to at least 95% maximum deflection should be removed, for minimally effective flow induced resonance mitigation purposes. Conversely, it has been found that the cutback should not encompass portion of blade 30 that are anticipated to be subjected to less than 65% maximum deflection.

Unacceptable aerodynamic or structural penalties, as well as the engine design authorities comfort level as to the exact location of the point of maximum deflection, will determine how much, between the 65% and 95% figure, the cutback will encompass. Also, the shape of cutback 35 is such that unnecessary aerodynamic penalties are avoided. As shown in FIG. 7, the shape of cutback 35 is that of an arc, but any other smooth shape, from an aerodynamic point of view (i.e. which does not produce unacceptable aerodynamic penalties to the engine's efficiency), is acceptable.

The identification of problematic natural vibration mode(s) from a flow induced resonance perspective during cross-wind conditions is typically accomplished through ground testing. As outlined above, once the problematic natural vibration mode that needs to be addressed is identified, the relevant cutback is affected on alternating blades (i.e. on second fan blades 30). There may however be cases where more than 1 problematic natural vibration mode is identified. In the exemplarity embodiment outlined above, the fan 12 includes circumferentially alternating sets of fan blades 24, each set including two different fan blade types, namely blades 28 and 30. It is to be understood, however, that each of these sets of fan blades 24 may include more than two different blade types, and need not comprise only pairs of blade types. For example, each set of fan blades may include three or more fan blades which differ from each other (e.g. a circumferential distribution of the fan blades which is as follows: blade types: A, B, C, A, B, C; or A, B, C, D, A, B, C, D, etc., wherein each of the capitalized letters represent different types of blades as described above). In the case where 2 problematic natural vibration modes are identified, blade type C would have a baseline profile with a cutback located around the relevant point of maximum deflection of this $2^{nd}$ problematic natural vibration mode. In the case where 3 problematic natural vibration modes are identified, blade type D would have a baseline profile with a cutback located around the relevant maximum deflection point of this $3^{rd}$ problematic natural vibration mode etc. . . .

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A fan for a gas turbine, the fan comprising fan blades circumferentially distributed around and extending a full span length from a central hub, the fan blades including alternating first fan blades and second fan blades, the first fan blades having a baseline profile and the second fan blades having a modified profile being the same as the baseline profile but for a leading edge cutback, the leading edge cutback on the second fan blades located between 20% and 50% of the full span length away from the hub, a maximum deflection point for a selected natural vibration mode of the first fan blade having the baseline profile is located at a given span, and wherein a span location on the second fan blades corresponding to the given span is located within the leading edge cutback.

2. The fan as defined in claim 1, wherein the leading edge cutback removes a portion of the baseline profile surrounding the maximum deflection point on the second fan blades and all points of at least 95% of maximum deflection of the selected natural vibration mode.

3. The fan as defined in claim 1, wherein the leading edge cutback removes a portion of the baseline profile surrounding the maximum deflection point on the second fan blades and all points of no less than 65% of maximum deflection of the selected natural vibration mode.

4. The fan as defined in claim 1, wherein the selected natural vibration mode is a natural vibration mode higher than a $1^{st}$ natural vibration mode.

5. The fan as defined in claim 4, wherein the selected natural vibration mode is a $5^{th}$ natural vibration mode.

6. The fan as defined in claim 1, wherein the fan blades are swept fan blades.

7. The fan as defined in claim 1, the fan blades including successively alternating first fan blades, second fan blades and third fan blades, the third fan blades having a second modified profile, the second modified profile being the same as the baseline profile but for cutback different from the cutback of the modified profile of the second fan blades.

8. A rotor for a gas turbine, the rotor comprising rotor blades circumferentially distributed around and extending a total span length from a central hub, the rotor blades including alternating first rotor blades and second rotor blades, the first rotor blades having a leading edge baseline profile and the second rotor blades having a leading edge profile with a leading edge cutback relative to the baseline profile, the leading edge cutback extending from a first span position to a second span position, wherein the first and second span positions are located at a distance away from the hub of between 20% and 50% of the total span length.

9. The rotor as defined in claim 8, wherein the first position is located radially outwardly of a span location corresponding to a maximum deflection point for a selected natural vibration mode of a fan blade having a leading edge baseline profile and the second span position is located radially inwardly of the maximum deflection point, the selected natural vibration mode being a natural vibration mode higher than a $1^{st}$ natural vibration mode.

10. The rotor as defined in claim 9, wherein the selected natural vibration mode is a $5^{th}$ natural vibration mode.

11. The fan as defined in claim 8, wherein the fan blades are swept fan blades.

12. A rotor for a gas turbine, the rotor comprising rotor blades circumferentially distributed around and extending a total span length from a central hub, the rotor blades including alternating first rotor blades and second rotor blades, the first rotor blades having a baseline profile and the second rotor blades having a profile with a leading edge cutback relative to the baseline profile, the leading edge cutback of the second rotor blades defining a removed portion of the baseline profile surrounding a maximum deflection point of a selected natural vibration mode higher than a $1^{st}$ natural vibration mode.

13. The rotor of claim 12, wherein the portion of the baseline profile removed by the cutback surrounds the maximum deflection point and all points of at least 95% of maximum deflection of the selected natural vibration mode.

14. The rotor of claim 12, wherein the portion of the baseline profile removed by the cutback surrounds the maximum deflection point and all points of no less than 65% of maximum deflection of the selected natural vibration mode.

15. The rotor as defined in claim 12, wherein the selected natural vibration mode is a $5^{th}$ natural vibration mode.

* * * * *